United States Patent [19]

Lewis et al.

[11] 4,384,295

[45] May 17, 1983

[54] LIQUID JET PRINTING APPARATUS USING A RASTER OF DROPS TO EFFECT PRINTING

[75] Inventors: John D. Lewis, Cambridge; Michael R. Keeling, Willingham; Graham D. Martin, Trumpington; Elaine A. Pullen, Milton, all of England

[73] Assignee: Cambridge Consultants Ltd., Cambridge, England

[21] Appl. No.: 246,219

[22] Filed: Mar. 23, 1981

[30] Foreign Application Priority Data

Mar. 26, 1980 [GB] United Kingdom ................. 8010102

[51] Int. Cl.[3] ............................................. G01D 18/00

[52] U.S. Cl. ....................................................... 346/75

[58] Field of Search ...................................... 346/75, 1

[56] References Cited

U.S. PATENT DOCUMENTS 3,828,354 8/1974 Hilton ............................... 346/75 X 4,034,379 7/1977 Berry ............................... 346/75 X

*Primary Examiner*—Stafford D. Schreyer

*Attorney, Agent, or Firm*—Browdy & Neimark

[57] ABSTRACT

An ink jet array printer in which the printing voltage waveform applied to each raster of drops formed in each printing gun comprises at least two successive sets of voltage levels which each arrange the raster drops in a group in time order of drop formation for each set of voltage levels so that corresponding drops in each of the groups formed in the raster, if charged for printing, have similar differences of voltage level and have similarly spaced print locations in the line section of drops printed by the printing gun. First and second correction voltages are applied to the charging voltage levels, the first to correct for the influence of the preceding drop and the second for the electrostatic and aerodynamic drag forces of a small number of drops influencing the drop being corrected. The set of second correction voltages derived for any particular drop being used also for corresponding drops in the other group(s).

9 Claims, 5 Drawing Figures

FIG. 2

56 DROP PRINTING RASTER

| | | | | | | | | | | | | | | | |
|---|---|---|---|---|---|---|---|---|---|---|---|---|---|---|---|
| ROW 1 | CHARGE ORDER | 1 | 2 | 3 | 4 | 5 | 6 | 7 | 8 | 9 | 10 | 11 | 12 | 13 | 14 |
| | PRINT POSITION | 9 | 17 | 29 | NP | 1 | NP | 13 | NP | 5 | NP | 21 | NP | 25 | NP |
| ROW 2 | CHARGE ORDER | 15 | 16 | 17 | 18 | 19 | 20 | 21 | 22 | 23 | 24 | 25 | 26 | 27 | 28 |
| | PRINT POSITION | 10 | 18 | 30 | NP | 2 | NP | 14 | NP | 6 | NP | 22 | NP | 26 | NP |
| ROW 3 | CHARGE ORDER | 29 | 30 | 31 | 32 | 33 | 34 | 35 | 36 | 37 | 38 | 39 | 40 | 41 | 42 |
| | PRINT POSITION | 11 | 19 | 31 | NP | 3 | NP | 15 | NP | 7 | NP | 23 | NP | 27 | NP |
| ROW 4 | CHARGE ORDER | 43 | 44 | 45 | 46 | 47 | 48 | 49 | 50 | 51 | 52 | 53 | 54 | 55 | 56 |
| | PRINT POSITION | 12 | 20 | 32 | NP | 4 | NP | 16 | NP | 8 | NP | 24 | NP | 28 | NP |

NP ≡ NOT PRINTED

FIG. 3

| | $(M-1)^{th}$ | |
|---|---|---|
| $M^{th}$ DROP | PRINTED | NOT PRINTED |
| PRINTED | $V_M$ | $V'_M$ |
| NOT PRINTED | $V_G$ | $V'_G$ |

FIG. 4

| MTH DROP NUMBER | DROPS INFLUENCING Mth DROP |
|---|---|
| 1 15 29 43 | M-14 M-10 M-8 M-6 M-2 M+1 M+4 |
| 2 16 30 44 | M-14 M-9 M-7 M-5 M-3 M-1 M+1 M+3 |
| 3 17 31 45 | M-10 M-8 M-6 M-4 M-2 M-1 M+2 |
| 4 18 32 46 | |
| 5 19 33 47 | M-28 M-14 M-10 M-4 M+3 M+2 |
| 6 20 34 48 | |
| 7 21 35 49 | M-20 M-16 M-6 M-5 M-2 M+2 M+4 |
| 8 21 36 50 | |
| 9 23 37 51 | M-18 M-16 M-14 M-8 M-4 M-2 M+2 |
| 10 24 38 52 | |
| 11 25 39 53 | M-14 M-6 M-4 M-2 M+5 |
| 12 26 40 54 | |
| 13 27 41 55 | M-8 M-6 M-4 M-2 M+2 M+3 |
| 14 28 42 56 | |

LIQUID JET PRINTING APPARATUS USING A RASTER OF DROPS TO EFFECT PRINTING

FIELD OF THE INVENTION

This invention relates to ink jet printers and more particularly to ink jet array printers. The term "ink" as used hereinafter is intended to embrace other printing liquids, such as liquid dyes, as well as liquid ink.

BACKGROUND OF THE INVENTION

Ink jet array printers employing one or more rows of ink jet printing guns and serving as pattern printers are described, for example, in United Kingdom Pat. Nos. 1,354,890 and 1,432,366 though when employing one row only of ink jet printing guns, they may be used for character or facsimile printing.

The printing apparatus described in the specifications referred to is adapted to print by depositing small drops of ink in accordance with printing information on a surface to be printed during continuous movement relatively to the apparatus of the surface and comprises one or several rows of ink jet printing guns, each gun having means for supplying printing ink under pressure to an orifice, means for forming regularly spaced drops in the ink stream issuing from the orifice, charge electrode means for charging the drops, means for applying to the charge electrode means, under the control of the printing information, a periodic printing voltage waveform whose period is sufficient to span the formation of a series, hereinafter referred to as a "raster" of consecutively formed drops, drop deflection means for providing transverse to the direction of relative movement of the apparatus and the printing surface a substantially constant electrostatic field through which the drops pass towards the printing surface thereby to deflect electrically charged drops transversely to said direction of relative movement to an extent dependent upon the charge levels on the drops and drop intercepting means for collecting drops other than those drops charged for printing on the printing surface, the drops charged for printing in the printing guns during each period of the voltage waveform being deposited in respective line sections formed by contiguous drops which sections together present a printed line transversely of the direction of relative movement, the printed lines being formed in contiguity successively at the frequency of the voltage waveform applied to the charge electrode means.

An ink jet printer as distinct from an ink jet array printer would possess a single printing gun of the structure described for the array printer and the line section of drops deposited by the gun in successive periods of the voltage waveform would constitute the contiguous print line.

Preferably start pulses are generated in the printer at intervals which correspond to the separation between successive printed lines during the motion of the printing surface, and the said voltage waveform is applied in the charge electrode means to the next formed drop following the start pulses and to the succeeding drops during the period thereof in accordance with United Kingdom Pat. No. 1,479,963. In this manner line sections are deposited at selected constant spacing on the printing surface, although the velocity of the surface is variable, and although the intervals which separate the start of the periods of the voltage waveform are also variable. Preferably also the series of voltage levels in the voltage waveform, which as specified spans the formation of a raster of drops formed in each printing gun, comprises a sequence of voltage levels generated in time order which is different from the sequence in order of magnitude, and the consecutive generation of high level voltages in the waveform for adjacent drops is as far as practical avoided in accordance with United Kingdom Pat. No. 1,491,234. Further the voltage levels generated in the voltage waveforms are modified in accordance with United Kingdom Pat. No. 1,533,659 to compensate in the location on the printing surface to which each drop is deflected for the effect thereon of adjacent drops in the event that said adjacent drops are inhibited from printing in accordance with the controlling printing information.

SUMMARY OF THE INVENTION

It is an object of the present invention to provide an ink jet printer or an ink jet array printer in which each printing gun operates with a drop raster which spaces the raster drops in their flight paths in an optimum manner. A further object is to facilitate the generation of correction voltages for reducing drop placement errors of raster drops charged for printing.

The present invention consists in an ink jet array printer of the form hereinbefore described, characterised in that there are provided means for generating the print voltage waveform applied to the charge electrode means of each printing gun which are adapted to provide in said waveform at least two successive sets of voltage levels for application to successively formed drops which arranged the raster drops in a group in time order of drop formation for each set of voltage levels so that corresponding drops in each of the groups formed in the raster, if charged for printing, have similar differences of voltage level and have similarly spaced print locations in the line section of drops printed by the printing gun and the line section is formed along its length at successive locations by corresponding drops from successive groups, and further characterised in that the means for generating the print voltage waveform include first correction voltage evaluating means and second correction voltage evaluating means for correcting the voltage level of the print voltage waveform for application to each drop formed which is charged for printing, of which the first correction voltage evaluating means is adapted to evaluate a correction voltage dependent upon the print status of the drop whose print voltage is to be corrected and the print status of the preceding drop, and, the second correction voltage evaluating means is adapted to evaluate a correction voltage which corrects for the effect of mutual electrostatic and aerodynamic forces of a number of raster drops in accordance with the print status thereof, said raster drops being in the immediate vicinity of the drop whose charging voltage level is to be corrected and being a significant influence on the flight path of that drop, and means are provided for employing the same set of voltages evaluated by the second correction voltage evaluating means for a particular drop for each of the corresponding drops in the groups.

Advantageously, means are provided for deriving and applying a third correction voltage to each of the drops of the raster intended for printing to compensate for the drop placement error attributable to aerodynamic drag in the flight path of the drop whose charging voltage is being corrected arising from variations in the numbers of prior unprinted drops in a substantial number of prior formed drops.

According to one aspect of the invention there is provided an ink jet printer adapted to print by depositing small drops of ink in accordance with printing information on a surface to be printed during continuous relative movement of the printer and the surface, comprising an ink jet printing gun having means for supplying printing ink under pressure to an orifice, means for forming regularly spaced drops in the ink stream issuing from the orifice, charge electrode means for charging the drops, means for applying to the charge electrode means, under the control of the printing information, a periodic voltage waveform whose period is sufficient to span the formation of a "raster" of consecutively formed drops, drop deflection means for providing transverse to the direction of relative movement of the apparatus and the printing surface a substantially constant electrostatic field through which the drops pass towards the printing surface thereby to deflect electrically charged drops transversely to said direction of relative movement to an extent dependent upon the charge levels on the drops and drop intercepting means for collecting drops other than those drops charged for printing on the printing surface, the drops charged for printing in the gun during each period of the voltage waveform being deposited in a line transverse to the direction of relative movement, the printed lines being formed in contiguity successively at the frequency of the voltage waveform applied to the charge electrode means, characterised in that there are provided means for generating the print voltage waveform applied to the charge electrode means which include first, second and third correction voltage evaluating means for correcting the voltage level of the print voltage waveform for application to each drop formed which is charged for printing, of which the first correction voltage evaluating means is adapted to evaluate a correction voltage dependent upon the print status of the drop whose print voltage is to be corrected and the print status of the preceding drop, the second correction voltage evaluating means is adapted to evaluate a correction voltage which corrects for the effect of mutual electrostatic and aerodynamic forces of a number of raster drops in accordance with the print status thereof, said raster drops being in the immediate vicinity of the drop whose charging voltage level is to be corrected and being a significant influence on the flight path of that drop, and, the third correction voltage evaluating means is adapted to derive a correction voltage to compensate for the drop placement error attributable to aerodynamic drag in the flight path of the drop whose charging voltage is being corrected arising from variations in the numbers of prior unprinted drops in a substantial number of prior formed drops.

Means may also be provided for applying an historical correction voltage to each drop in the raster which depends on the print status of the drop to be corrected and the print status of the preceding drop.

Advantageously, means are provided for applying a correction voltage to each of the drops of the raster intended for printing to compensate for the drop placement error attributable to aerodynamic drag in the flight path on the drop arising from variations in the numbers of prior unprinted drops.

BRIEF DESCRIPTION OF THE DRAWINGS

The invention will now be described, by way of example, with reference to the accompanying drawings, in which:

FIG. 2 is a table of data relating to the arrangement of a drop raster required to implement the invention, FIG. 3 is the truth table for drop M of a drop raster showing the voltage conditions where drops M and M−1 are printed or not printed, FIG. 4 is a table showing the drops which influence the raster drops when the latter are arranged as shown in FIG. 2.

DESCRIPTION OF PREFERRED EMBODIMENTS

Figure 1:
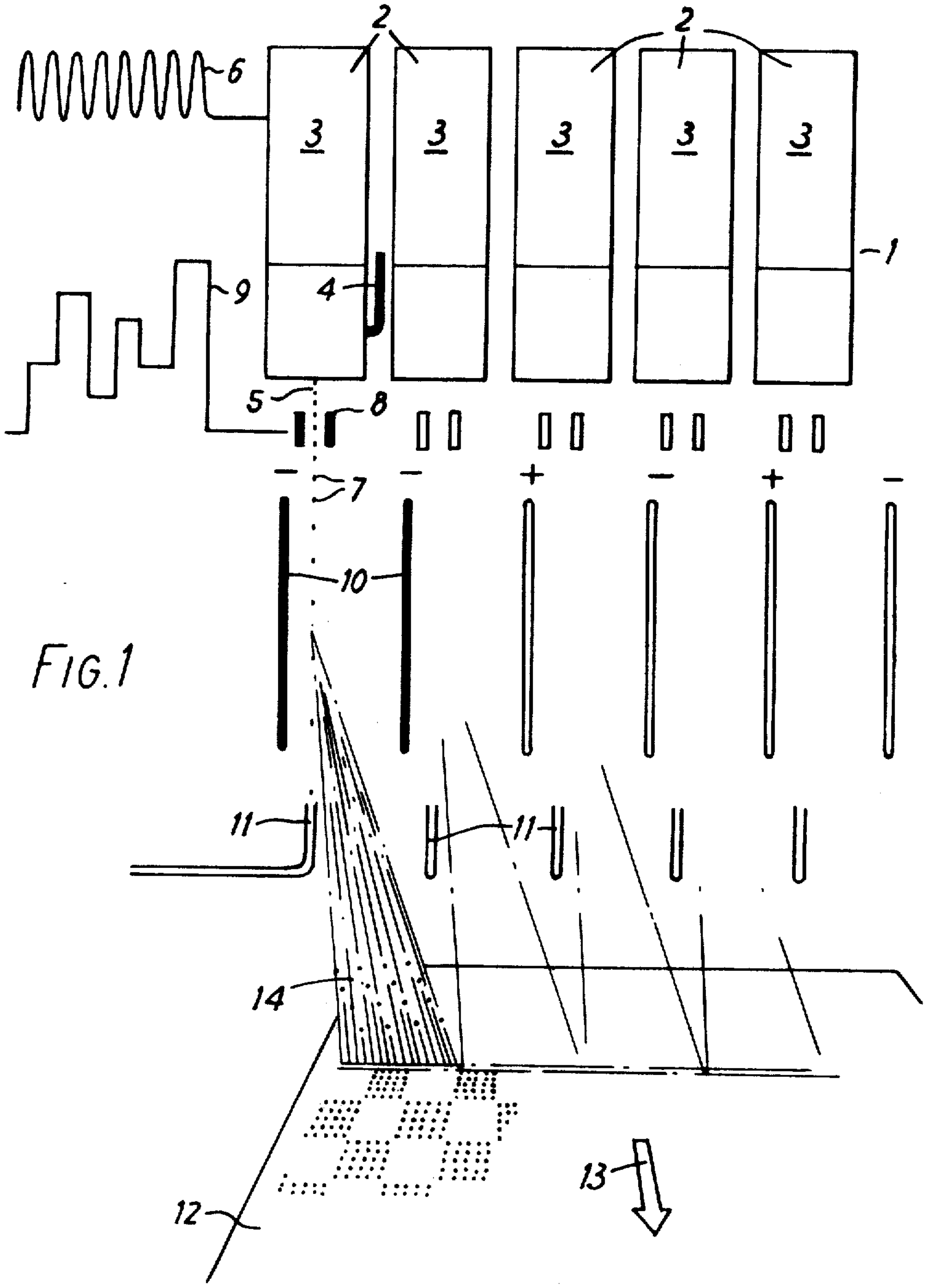
FIG. 1 shows in diagrammatic form a sectional elevation of part of a simplified form of the type of ink jet array printer with which the invention is concerned.

Referring first to FIG. 1; an ink jet array printer 1 has a row of printing guns, five of which are illustrated. Each gun 2 comprises a chamber 3 housing a modulation assembly, suitably a piezo-electric resonator, and having a pressurised ink supply 4 and at its lower end an orifice from which a liquid ink jet 5 issues. Because of the modulation signal as shown at 6 applied to the ink in each chamber by means of the piezo-electric resonator, the ink jet 5 as is well known breaks down into a stream of regularly spaced and equal sized drops 7. At the location of drop formation is disposed a charge electrode 8 to which is applied a stepped voltage waveform 9 under the control of printing information. If the printing information calls for a printed drop, the appropriate voltage level from the waveform 9 is applied to the electrode for a drop formation period, and the drop separating from the jet 5 in that period acquires a charge corresponding to the applied voltage. The ink drops pass between deflector plates 10, to which are applied voltages from a high tension d.c. source, so that those drops which are charged are deflected by the resulting deflection field, and uncharged drops pass to a gutter 11 for collection and recirculation. The charged drops are deflected for printing in which case they are deposited on a substrate 12 which moves in the direction of the arrow 13. Alternatively the deflected drops may be given a charge which deflects them sufficiently for them to be collected in the next adjacent gutter 11. In the simplified case illustrated in FIG. 1 in which only uncharged drops are collected, a raster 14 of sixteen drops is employed. This means that the voltage waveform 9 will comprise sixteen voltage levels appropriate for printing and sixteen successive drops in each ink jet stream 5 can be charged and printed. The drops selected for printing by the printing information for deposition on the substrate 12 are put down in successive rows each row being printed in the cycle time of the waveform 9. Adjacent guns 2 print those drops required for printing in respective contiguous line sections which together form a complete print line.

The present invention is concerned with optimum placement of printed drops in the raster and with correcting the voltage levels applied to the charge electrodes in the present instance in an array printer during printing to take account of one or more of a variety of factors such as the aerodynamic and electrostatic influences between neighbouring drops and the aerodynamic drag on drops in their flight paths arising from changes in the rates of drops being printed. The description which follows takes as its starting point an ink jet array printer operating at a drop generation rate of 120 KHz. The raster employed is a fifty six drop raster each such raster intended for printing purposes being followed by a fifty six drop inter-raster of unprinted drops. This arrangement limits operation to a substrate speed which is half that possible when all rasters contain printed drops.

As will be apparent from FIG. 2, the printing raster is a fixed sequence of drops, which is listed in order of drop formation i.e. charging order, separated into four groups. Each group contains fourteen drops of which six drops are unprinted drops. These unprinted drops are ascribed a voltage level which deflects them to the appropriate gutter for collection and are included to space the printed drops sufficiently in their flight paths in the printed raster to avoid the possibility of drop coalescence under any likely combination of printed drops.

Each of the four groups contains eight drops available for printing, so that the complete printing raster is capable of printing thirty two drops in the line section. Each of the thirty two drops tabulated in FIG. 2 is designated by two numbers, the first of which specifies the charge order of the drops, and the second the print position in the line section. The sequence of numbers which specify print positions increases broadly in step with the sequence of voltages required to deposit the drops in the printing substrate at the corresponding print position. It will thus be appreciated that the voltage levels in the voltage waveform applied to each charge electrode under the control of pattern information are chosen so that corresponding drops of each group in the raster, if printed, are equally spaced along the line section which is formed along its length by drops from successive groups.

However it is required to maintain an accuracy of drop placement for each drop in a gun of typically one quarter of a drop spacing in the line section. The correction voltages to achieve this are found to vary for each drop, depending on which of neighbouring drops are printed, and also the recent density of printing. The voltages required to deposit the drops in the printing raster within tolerance in their correct print positions according to the printing information, which specifies the printing status of neighbouring drops in the raster, are found experimentally.

The voltage required to deposit any drop, e.g. the Mth drop, in the raster correctly at the substrate in the event that all the surrounding drops in the raster are also correctly printed is known as the base voltage $V_M$. If the same drop is not printed, but is collected in the gutter, a second voltage $V_G$ is obtained, this voltage being not necessarily zero, but that level which having regard to the influences of neighbouring drops, induces a zero charge on it.

The drop that has the greatest influence on the print position of the Mth drop is empirically found to be the previously formed (M−1)th drop, so that the major correction to the base voltage $V_M$ is the influence on $V_M$ of the print status of drop (M−1) to compensate for the effect on the print position of the Mth drop in the event that the (M−1)th drop is not printed. In this event a first correction voltage is subtracted from $V_M$ and $V_G$. A truth table is shown in FIG. 3 and shows four states for the Mth drop corresponding to whether each drop is printed or not. In practice four voltage levels are stored, those for the unprinted status of drop (M−1) (i.e. the correction voltages added to, or more normally subtracted from, $V_M$ and $V_G$) being stored as $V'_M$ and $V'_G$. If the (M−1)th drop is always unprinted, as is seen to occur for several drops in the raster, the voltages $V_M'$ and $V_G'$ can if desired be used for the modified base voltages under the influence of the (M−2)th drop in the event that the (M−2)th drop is not printed.

The base voltage correction store is a random access memory which requires a capacity of $2^2 \times 2^6 \times$ ten bits, since there are four states for each base voltage, fifty six such voltages and each voltage for the required accuracy needs to be defined by a ten bit word. The binary power six is the lowest power needed to accommodate the fifty six voltages of the printing raster. Thus the storage capacity of the base voltage store is 256 ten bit words of which only 224 (i.e. 4×56) ten bit words are used. The use of a ten bit word arises because there are 32 print locations in a line section which may be printed and a drop placement accuracy to one quarter of a drop pitch is required. Thus there are 4×32 drop placement positions i.e. $2^7$ bits needed across the printed width. The full span of print locations between position detectors, which locate each printed line section in the print line is specified by 4×64 placement positions i.e. $2^8$ bits. This calls for eight bit drop location accuracy but ten bit accuracy is used for the base voltage values to maintain adequate printing tolerances, because of non-linearity between the location and voltage values. The voltages take values up to approximately 250 volts to an accuracy of 0.25 volts.

The next correction, referred to hereinafter as $\Delta V_{M2}$ and termed the "second" correction to be applied, is that which corrects for the effect of mutual electrostatic and aerodynamic forces which influence the flight path of a charged drop in accordance with the print status of a number of other drops in the raster found experimentally to be of significant influence. It will be seen from FIG. 2 that corresponding drops in print order in each of the four groups or rows into which the raster is divided are placed in adjacent print positions. Thus for example drops 2, 16, 30, 44 are printed in adjacent positions 17, 18, 19 and 20. Consequently the charge levels of the drops and their mutual spacings in their flight paths are closely similar. The correction voltages required to correct for these "significant" drops are smaller than the correction voltages required to effect the first corrections to the base voltage. Because of these features sufficient correction accuracy is accomplished by deriving the correction voltage for corresponding drops in each of the four groups of the raster from the same set of correction voltages. This reduces by a factor of four the information required to store the second correction terms.

FIG. 4 shows for the raster specified in FIG. 2 the drops whose print status has most influence on each of the fourteen drops in each of the four groups in the printing raster. It will be recalled that the base voltage $V_M$ is that voltage required to place the Mth drop correctly in the print line in the circumstance where all the other drops are printed. Measurements show that as many as eight drops can individually or in combination significantly influence the print location of any drop and that the influences are not additive. Accordingly as many as $2^8$ correction voltages corresponding to the print status of the eight significant drops are measured. Such sets of "second" correction voltages are obtained for each of the fourteen drops.

It will be seen in FIG. 4 that certain of the drops said to be influencing the Mth drop lie outside the raster. For example drops M-14, M-10, M-6 and M-2 are indicated as influencing drop Number 1. These drops however occur in the inter-raster and are therefore always unprinted drops since only alternate rasters of fifty six drops are used for printing. Similarly in the case of drop fifty five which is indicated as being influenced, inter alia, by drops M+2 and M+3, these drops occur in the succeeding raster which again is an unprinted inter-raster. Since unprinted drops always call for a correction voltage to be applied, the corrections corresponding to the drops listed above are always applied, but in the case of the corresponding drops in other groups in the raster, the same correction may be applied or not according to the printing information. This fact had to be allowed for in the original specification of the base voltages.

It will be noted from FIG. 4 that none of the gutter voltages requires a "second" correction term since the print tolerance is more precise than the location error tolerance of gutter drops.

As an example of how the second correction is effected consider the drop M=13 printed in print position 25. It is influenced as follows:

| Influence Number | M−8 | M−6 | M−4 | M−2 | M+2 | M+3 | — | — |
|---|---|---|---|---|---|---|---|---|
| Time Order | 5 | 7 | 9 | 11 | 15 | 16 | — | — |
| Print Position | 1 | 13 | 5 | 21 | 10 | 18 | — | — |

Let it be supposed that the print pattern for the drops influencing the drop M=13, where 1 designates a printed drop and 0 an unprinted drop, is as follows:

| M−8 | M−6 | M−4 | M−2 | M+2 | M+3 | — | — |
|---|---|---|---|---|---|---|---|
| 1 | 0 | 1 | 1 | 0 | 0 | 0 | 0 |

Thus for the drop M=13 the eight bit address (10110000) locates the second correction $\Delta V_{M2}$ which is the correction voltage for that combination of printed and unprinted drops. The correction would be the same for drop M=27 if the influencing drops had the same print status. The correction would be different if different drops were inhibited from printing or if one or more inhibited drops were printed. In the case of a drop where the address for the correction voltage read (11111111), the correction would be zero.

The memory size for the second correction voltages is 8×256×7 bits. The number 8 accounts for the eight drops capable of being printed in each of the four groups of the raster. The number 256 is equal to $2^8$, i.e. the number of bits required for the 8 bit address for the significant drops which influence the printing drop whilst the number 7 is experimentally determined. By experiment it is found that the maximum "second" correction voltage is sometimes greater than sixteen and always less than thirty two volts and that an accuracy in this figure to 0.25 volts is adequate. The 128 possible voltages that therefore arise are each covered by storage capacity of $2^7=128$ bits.

As stated earlier the arrangement of the raster into four groups where corresponding drops in the groups have a similar printing history simplifies the evaluation of the correction voltage needed and reduces the memory size to one quarter of what would be needed in the absence of grouping.

A final or third correction $\Delta V_{M3}$ incorporates the aerodynamic effect on the flight paths of individual printed drops attributable to variations in the recent density of drops in flight. When the previous 32 printable drops which precede a drop being printed were in fact not printed the movement of ambient air in the vicinity of the printed drop flight path is substantially retarded compared with the case where the majority of the drops were printed. In the first case there is greater resistance to the flight of the printed drop between the deflection plates so that that drop is subject for a longer period to the electrostatic field of the deflection plates and increased drop deflection occurs. Similarly after a period when no drops are printed it takes a substantial chain of about 8 drops to accelerate the air flow in which a printed drop moves in its flight path to a magnitude similar to that which obtains during the measurement of its base voltage.

It has been found experimentally that the third correction can be represented with sufficient accuracy by the expression $$\Delta V_{M3} = \Delta V\left(\frac{m}{M}\cdot\frac{n}{N}\right)$$

where M & N respectively equal a first and a second preset number, excluding the six unprinted drops of each group, of preceding drops in the drop stream of the drop to be corrected. m & n equal the numbers of unprinted drops respectively in the numbers M & N, and M is appreciably greater than N. ΔV=the difference for each drop in the raster between the isolated drop voltage when printed in its correct position and the voltage applied to that drop when the correction for all its significant drops has been made, i.e.

$$\Delta V=(V_W-V_B)$$

where $V_W$ is the isolated drop voltage, i.e. is the voltage for the correct placement of a drop printed in a white i.e. unprinted, region and $V_B$ is the voltage in a black i.e. fully printed, region so that $$V_B=V_M.$$

A typical example of how the aerodynamic voltage correction is found is as follows:

Let

ΔV=7.5 volts $M$=32 (i.e. 32 drops are capable of being printed in the 56 drops)

m=20

N=8 n=2

$$\Delta V_{M3} = 7.5 \cdot \frac{20}{32} \cdot \frac{2}{8} = 1.17 \text{ volts}$$

The objective of this correction is to take account of the small effect on a particular drop of individual preceding drops which are not considered to be significant drops in terms of the magnitude of their sole influence on $V_M$. The effect being considered is principally the result of changes in the air core velocity in the flight path of the printed drop.

As will be apparent by inspection of the expression from which $\Delta V_{M3}$ is calculated, the higher the numbers m, n of unprinted drops in the series M & N, the higher the value of $\Delta V_{M3}$. In other words the fewer the drops being printed the greater is the aerodynamic correction voltage applied.

The aerodynamic effect is thus treated in terms of (a) the retardation of the air core according to the status of the 32 preceding drops, and (b) the air core acceleration of the immediately preceding eight drops.

The correction enables the cumulative effect of drops to be accounted for whose individual influence is not considered significant. One attendant advantage is that it enables the number of significant drops to be reduced and so the corresponding number of corrections and memory size to be reduced.

The third correction voltage can now be obtained, for example, by maintaining for each drop to be printed, a running total of the number of drops in the previous M=32 and in the previous N=8 drops that were not printed. A read only memory of 8×32=256 locations is a convenient way to effect the selection of the third correction voltage in accordance with the prevailing values of m and n for the printed drop.

Figure 5:
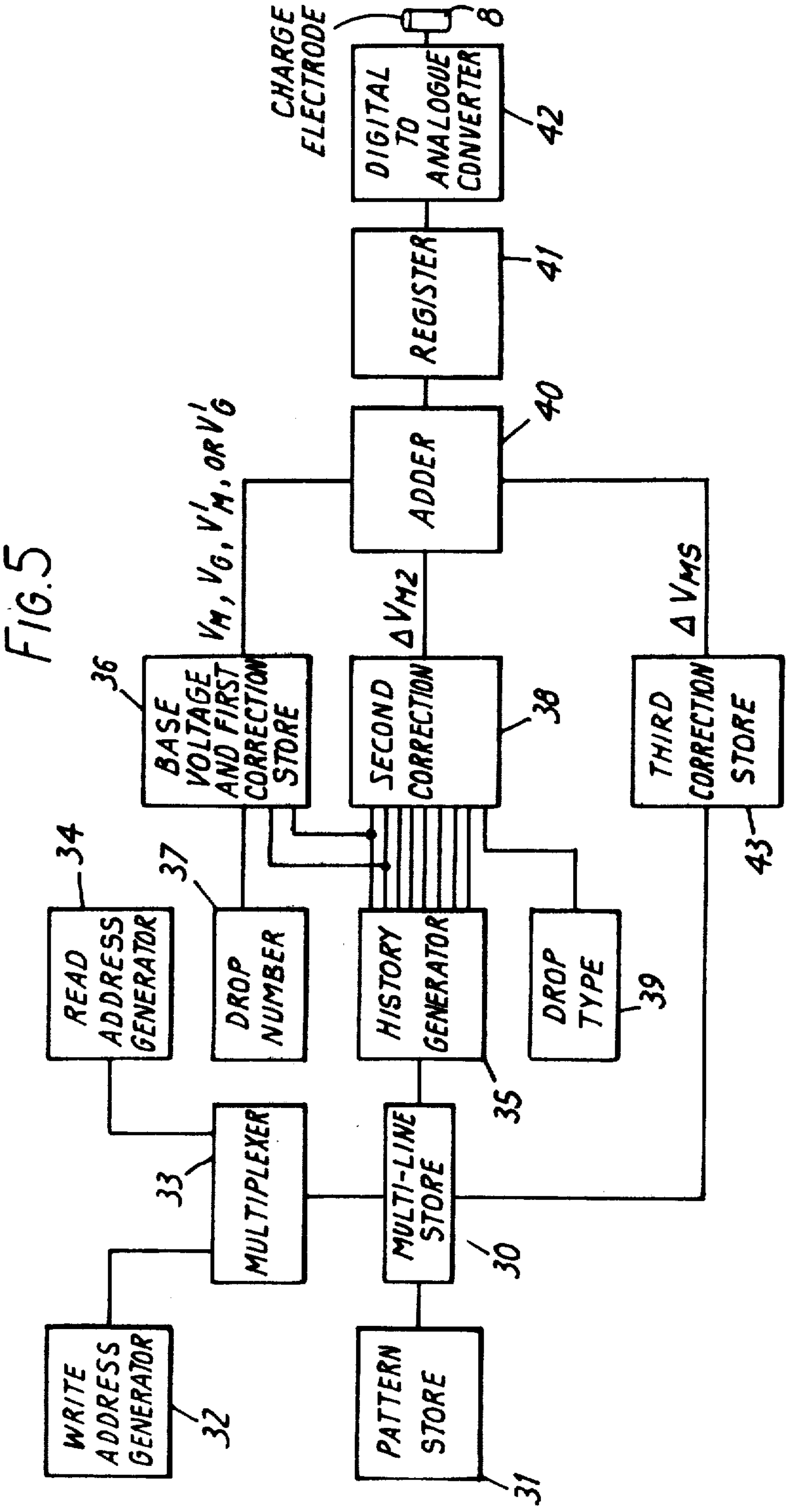
FIG. 5 is a block diagram of the electronic control circuit for applying correction voltages in accordance with the invention to the drops of each raster when charged.

Referring now to FIG. 5, where printing is to start, pattern information from the pattern store 31 is fed to the multiline store 30. The pattern data, indicating print/no print, is written to the single bit locations in the multiline store specified by the Write Address Generator 32 fed via a multiplexer 33. The Write Address Generator serves the dual purpose of re-arranging the pattern data into groups, so that the data is stored in approximate time order (rather than printed pattern order) and it also allows a variable delay to be introduced, in the printing of the pattern by varying the separation between write addresses and read addresses, as generated by the Read Address Generator 34.

At the start of each drop production cycle, the Read Address Generator 34 works its way through the multiline store, accessing those locations which contain data on drops which affect the charging voltage of the drop about to be generated. This data is loaded into a series of flip-flops in the History Generator 35. The outputs from these flip-flops address the Correction Store 38 and in the case of the data representing the drop about to be generated and its predecessor, the Base Voltage Store 36. Other address lines for the Base Voltage Store are provided by a Drop Number Generator 37 indicating which drop in the whole raster is being processed. The Drop Type Generator 39 provides a number indicating the position within the group of the drop being processed. The Base Voltage Store 36 generates the corrected base voltages directly, one of the four voltage locations for each drop being selected by the History Generator 35. The second correction Voltage Store 38 generates the correction $\Delta V_{M2}$ (generally a negative number) which is added to the corrected Base Voltage $V_M$, $V_G$, $V'_M$ or $V'_G$ in the adder 40. Also supplied to the adder 40 is the output $\Delta VM_3$ of the third correction store 43. This store is addressed from information contained in the multiline store 30. At the start of the next drop production cycle the output from the adder is loaded into the register 41. The output from the register 41 feeds the high voltage digital to analogue converter 42 which generates a voltage which is applied to the charge electrode 8 of the associated printing gun 3.

Although the invention has been described with reference to an ink jet array printer it will be apparent that the invention is equally applicable to a single jet, ink jet printer in which case the successive print lines put down by the ink jet are the entire print lines rather than, as in the array printer, line sections which together with the line sections printed by adjacent ink jets form the print lines.

We claim:

1. An ink jet array printer adapted to print by depositing small drops of ink in accordance with printing information on a surface to be printed during continuous movement relatively to the apparatus of the surface, comprising one or several rows of ink jet printing guns, each gun having means for supplying printing ink under pressure to an orifice, means for forming regularly spaced drops in the ink stream issuing from the orifice, charge electrode means for charging the drops, means for applying to the charge electrode means, under the control of the printing information, a periodic printing voltage waveform whose period is sufficient to span the formation of a "raster" of consecutively formed drops, drop deflection means for providing transverse to the direction of relative movement of the apparatus and the printing surface a substantially constant electrostatic field through which the drops pass towards the printing surface thereby to deflect electrically charged drops transversely to said direction of relative movement to an extent dependent upon the charge levels on the drops, and drop intercepting means for collecting drops other than those drops charged for printing on the printing surface, the drops charged for printing in the printing guns during each period of the voltage waveform being deposited in respective line sections formed by contiguous drops which sections together present a printed line transversely of the direction of relative movement, the printed lines being formed in contiguity successively at the frequency of the printing voltage waveform applied to the charge electrode means, characterized in that there are provided means for generating the print voltage waveform applied to the charge electrode means of each printing gun which are adapted to provide in said waveform at least two successive sets of voltage levels for application to successively formed drops which arrange the raster drops in a group in time order of drop formation for each set of voltage levels so that corresponding drops in each of the groups formed in the raster, if charged for printing, have similar differences of voltage level and have similarly spaced print locations in the line section of drops printed by the printing gun and the line section is formed along its length at successive locations by corresponding drops from successive groups, and further characterised in that the means for generating the print voltage waveform include first correction voltage evaluating means and second correction voltage evaluating means for correcting the voltage level of the print voltage waveform for application to each drop formed which is charged for printing, of which the first correction voltage evaluating means is adpated to evaluate a correction voltage dependent upon the print status of the drop whose print voltage is to be corrected and the print status of the preceding drop, and, the second correction voltage evaluating means is adapted to evaluate a correction voltage which corrects for the effect of mutual electrostatic and aerodynamic forces of a number of raster drops in accordance with the print status thereof, said raster drops being in the immediate vicinity of the drops whose charging voltage level is to be corrected and being a significant influence on the flight path of that drop, and means are provided for employing the same set of voltages evaluated by the second correction voltage evaluating means for a particular drop for each of the corresponding drops in the groups.

2. A printer as claimed in claim 1, characterised in that the raster drops are arranged in four groups and each group contains one or more drops charged to such a level as to be deposited in the drop intercepting means and serving to space in flight drops charged for printing sufficiently to minimise risk of drop flight collisions.

3. A printer as claimed in claim 1, characterised in that regularly spaced rasters only are employed for printing while rasters between said regularly spaced rasters are unprinted.

4. A printer as claimed in claim 1, characterised in that the set of second correction voltages for each of corresponding drops in the respective groups of the raster is derived from the print status of a set of drops selected as influencing the required correction voltage, the sets of influencing drops being related, in order of formation of each set, in identical manner to the drops whose respective correction voltages they are being used to evaluate.

5. A printer as claimed in claim 1, characterised in that means are provided for deriving and applying a third correction voltage to each of the drops of the raster intended for printing to compensate for the drop placement error attributable to aerodynamic drag in in the flight path on the drop whose charging voltage is being corrected arising from variations in the numbers of prior unprinted drops in a substantial number of prior formed drops.

6. A printer as claimed in claim 5, characterised in that the third voltage correction evaluating means are adapted to take account of the print status of a relatively small number and of a relatively large number of drops preceding said particular drop.

7. A printer as claimed in claim 5, characterised in that the means for deriving and applying the third correction voltage are adapted to derive said correction voltage in accordance with the equation:

$$\Delta V_{M3} = \Delta V \left\{ \frac{m}{M} \cdot \frac{n}{N} \right\}$$

where $\Delta V_{M3}$ is the third correction voltage $\Delta V$ is the difference between the isolated drop voltage for correct placement of a drop in a line section of drops where all other drops are unprinted and the isolated drop voltage for correct place of said drop in a line section of drops where all drops are printed, M and N are preset numbers, M being substantially greater than N, of preceding drops, excluding unprinted drops, in the drop stream of the drop whose charging voltage level is being corrected and m and n equal the numbers of unprinted drops respectively in the numbers M and N.

8. An ink jet printer adapted to print by depositing small drops of ink in accordance with printing information on a surface to be printed during continuous relative movement of the printer and the surface, comprising an ink jet printing gun having means for supplying printing ink under pressure to an orifice, means for forming regularly spaced drops in the ink stream issuing from the orifice, charge electrode means for charging the drops, means for applying to the charge electrode means, under the control of the printing information, a periodic voltage waveform whose period is sufficient to span the formation of a "raster" of consecutively formed drops, drop deflection means for providing transverse to the direction of relative movement of the apparatus and the printing surface a substantially constant electrostatic field through which the drops pass towards the printing surface thereby to deflect electrically charged drops transversely to said direction of relative movement to an extent dependent upon the charge levels on the drops and drop intercepting means for collecting drops other than those drops charged for printing on the printing surface, the drops charged for printing in the gun during each period of the voltage waveform being deposited in a line transverse to the direction of relative movement, the printed lines being formed in contiguity successively at the frequency of the voltage waveform applied to the charge electrode means, characterised in that there are provided means for generating the print voltage waveform applied to the charge electrode means which include first, second and third correction voltage evaluating means for correcting the voltage level of the print voltage waveform for application to each drop formed which is charged for printing, of which the first correction voltage evaluating means is adapted to evaluate a correction voltage dependent upon the print status of the drop whose print voltage is to be corrected and the print status of the preceding drop, the second correction voltage evaluating means is adapted to evaluate a correction voltage which corrects for the effect of mutual electrostatic and aerodynamic forces of a number of raster drops in accordance with the print status thereof, said raster drops being in the immediate vicinity of the drop whose charging voltage level is to be corrected and being a significant influence on the flight path of that drop, and, the third correction voltage evaluating means is adpated to derive a correction voltage to compensate for the drop placement error attributable to aerodynamic drag in the flight path of the drop whose charging voltage is being corrected arising from variations in the numbers of prior unprinted drops in a substantial number of prior formed drops.

9. A printer as claimed in claim 8, characterised in that the third correction voltage evaluating means are adapted to take account of the print status of a relatively small number and of a relatively large number of drops preceding the particular drop, the charging voltage level of which is to be corrected.

* * * * *